United States Patent
Pfeilschifter et al.

(10) Patent No.: US 11,731,523 B2
(45) Date of Patent: *Aug. 22, 2023

(54) VEHICLE-SIDE CHARGING DEVICE

(71) Applicant: Vitesco Technologies GmbH, Hannover (DE)

(72) Inventors: Franz Pfeilschifter, Munich (DE); Martin Götzenberger, Munich (DE); Harald Schmauss, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 139 days.

This patent is subject to a terminal disclaimer.

(21) Appl. No.: 17/312,153

(22) PCT Filed: Dec. 11, 2019

(86) PCT No.: PCT/EP2019/084728
§ 371 (c)(1),
(2) Date: Jun. 9, 2021

(87) PCT Pub. No.: WO2020/120613
PCT Pub. Date: Jun. 18, 2020

(65) Prior Publication Data
US 2022/0041075 A1     Feb. 10, 2022

(30) Foreign Application Priority Data
Dec. 12, 2018   (DE) .................. 10 2018 221 519.7

(51) Int. Cl.
*B60L 53/22* (2019.01)
*B60L 53/14* (2019.01)
(Continued)

(52) U.S. Cl.
CPC ............... *B60L 53/22* (2019.02); *B60L 53/14* (2019.02); *H02J 7/06* (2013.01); *H02M 1/007* (2021.05);
(Continued)

(58) Field of Classification Search
CPC ...... B60L 53/22; B60L 53/14; B60L 2210/12; B60L 2210/14; B60L 2210/30; H02J 7/06;
(Continued)

(56) References Cited

U.S. PATENT DOCUMENTS

| 6,054,674 A | 4/2000 | Moriguchi et al. ...... 219/130.21 |
| 2014/0112025 A1 | 4/2014 | Mueller et al. ................. 363/17 |

(Continued)

FOREIGN PATENT DOCUMENTS

| DE | 94 03 447 | 6/1994 | ............. H02M 5/44 |
| DE | 10 2011 075927 | 11/2012 | ............. H02M 1/10 |

(Continued)

OTHER PUBLICATIONS

Search Report for International Application No. PCT/EP2019/084728, 13 pages, dated Mar. 19, 2020.
(Continued)

*Primary Examiner* — Paul Dinh
(74) *Attorney, Agent, or Firm* — Slayden Grubert Beard PLLC

(57) ABSTRACT

Various embodiments of the teachings herein include a vehicle-side charging apparatus comprising: an AC voltage connection; a rectifier connected to the AC voltage connection; a first DC/DC converter and a second DC/DC converter; and a DC voltage connection. Each DC/DC converter includes a intermediate circuit capacitor and a switch unit. The rectifier is connected to the DC voltage connection via the DC/DC converters. There is a switch connecting the
(Continued)

DC/DC converters in a switchable manner. In a first switching state the respective intermediate circuit capacitors and the respective switch units of the DC/DC converters are connected in parallel with one another and in a second switching state in series with one another. There is a third DC/DC converter connecting the rectifier to the DC voltage connection.

11 Claims, 1 Drawing Sheet

(51) Int. Cl.
*H02M 1/00* (2006.01)
*H02J 7/06* (2006.01)
*H02M 3/158* (2006.01)
*H02M 1/12* (2006.01)
*H02M 1/42* (2007.01)

(52) U.S. Cl.
CPC ....... *H02M 3/1582* (2013.01); *B60L 2210/12* (2013.01); *B60L 2210/14* (2013.01); *H02M 1/12* (2013.01); *H02M 1/4208* (2013.01)

(58) Field of Classification Search
CPC ...... H02M 1/007; H02M 3/1582; H02M 1/12; H02M 1/4208; H02M 1/0074; H02M 1/10; H02M 3/1584; Y02T 10/72; Y02T 10/70; Y02T 10/7072; Y02T 90/14; Y02T 10/92
USPC .......................................................... 320/109
See application file for complete search history.

(56) References Cited

U.S. PATENT DOCUMENTS

| 2016/0121740 | A1 | 5/2016 | Zaki ..................... B60L 11/1811 |
| 2020/0106367 | A1* | 4/2020 | Bendani .................. B60L 53/22 |

FOREIGN PATENT DOCUMENTS

| DE | 102012203612 A1 | 9/2013 | ............ H01M 10/44 |
| DE | 10 2013 007971 | 11/2014 | ................ H02J 7/00 |
| DE | 10 2017 206809 | 1/2018 | .............. H02M 3/00 |
| EP | 2 445 747 | 8/2013 | .............. H02M 1/00 |
| EP | 2 690 745 | 1/2014 | ................ H02J 7/00 |
| EP | 3 238 334 | 7/2019 | ................ H02J 7/00 |
| JP | 11206123 A | 7/1999 | ............ B23K 9/073 |
| WO | 2018/029861 A1 | 2/2018 | .............. H02M 7/06 |

OTHER PUBLICATIONS

German Office Action, Application No. 102018221519.7, 11 pages, dated Dec. 2, 2019.

Korean Office Action, Application No. 10-2021-7021374, 4 pages, dated Apr. 27, 2023.

* cited by examiner

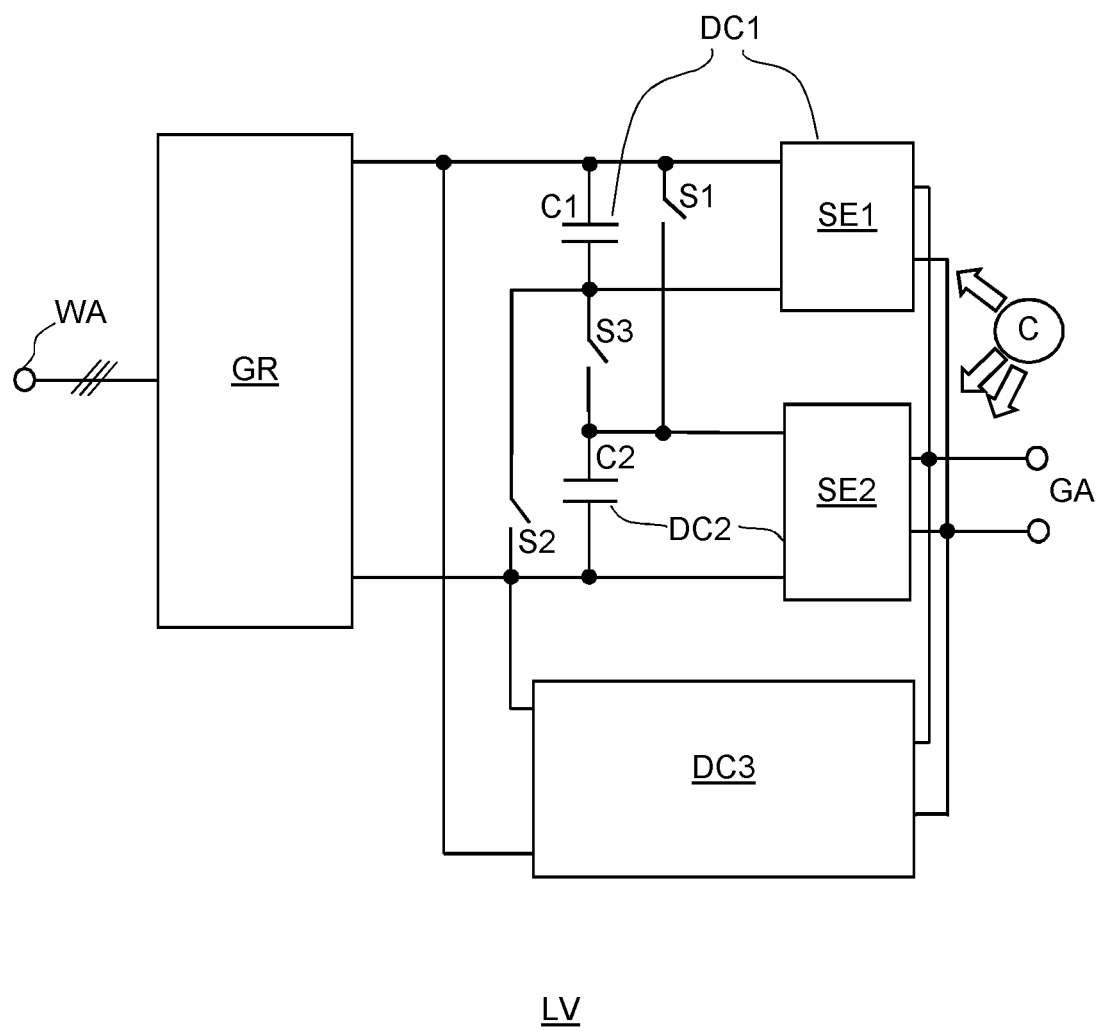

VEHICLE-SIDE CHARGING DEVICE

CROSS-REFERENCE TO RELATED APPLICATIONS

This application is a U.S. National Stage Application of International Application No. PCT/EP2019/084728 filed Dec. 11, 2019, which designates the United States of America, and claims priority to DE Application No. 10 2018 221 519.7 filed Dec. 12, 2018, the contents of which are hereby incorporated by reference in their entirety.

TECHNICAL FIELD

The present disclosure relates to vehicles having an electric drive. Various embodiments of the teachings herein include vehicle-side charging devices for electric drives.

BACKGROUND

Vehicles having an electrical drive have a rechargeable battery in order to supply the drive. A charging socket is provided in numerous vehicles in order to transmit energy from the outside to the rechargeable battery, for instance as part of a charging operation. When a vehicle is connected to an AC voltage network, a plurality of electrical parameters which influence operating variables such as the voltage or power of the charging circuit may vary. These variable parameters are, for example, the number of phases, which depends on the configuration of the AC voltage connection, and the voltage or configuration of the AC voltage network. The variable parameters can be different in different regions.

SUMMARY

The teachings of the present disclosure may be used with different forms of AC voltage connections to provide cost-effective methods to charge an energy store in a vehicle. For example, some embodiments of the teachings herein may include a vehicle-side charging apparatus (LV) having an AC voltage connection (WA), a rectifier (GR) connected thereto, at least one first and one second DC/DC converter (DC1, DC2), each of which has at least one intermediate circuit capacitor (C1, C2) and at least one switch unit (SE1, SE2), and a DC voltage connection (GA), wherein the rectifier (GR) is connected to the DC voltage connection (GA) via the DC/DC converters (DC1, DC2), wherein the charging apparatus (LV) comprises a switch apparatus (S1, S2, S3), which connects the first to the second DC/DC converter (DC1, DC2) in a switchable manner, wherein the switch apparatus (SV) in a first switching state connects the intermediate circuit capacitors (C1, C2) and the switch units (SE1, SE2) of the first and second DC/DC converters (W1, W2) in parallel with one another and in a second switching state (2) connects the intermediate circuit capacitors (C1, C2) and the switch units (SE1, SE2) in series with one another, wherein the charging apparatus (LV) also has at least one third DC/DC converter (DC3), which also connects the rectifier (GR) to the DC voltage connection (GA).

In some embodiments, the first, second and third DC/DC converter (DC1-DC3) each have connections which are connected to the DC voltage connection (GA) and in parallel with one another.

In some embodiments, the first DC/DC converter (DC1), the second DC/DC converter (DC2) or the first DC/DC converter (DC1) and the second DC/DC converter (DC2) are DC-isolating DC/DC converters.

In some embodiments, the first DC/DC converter (DC1) and the second DC/DC converter (DC2) are each configured as a buck-boost converter and the third DC/DC converter is designed either as a buck converter or a boost converter.

In some embodiments, the rated powers of the first and second DC/DC converters (DC1, DC2) are essentially the same.

In some embodiments, the rated powers of the first and second DC/DC converters (DC1, DC2) each essentially correspond to half the rated power of the third DC/DC converter (DC3).

In some embodiments, the rectifier (GR) is provided with a boost function.

In some embodiments, the rectifier (GR) is designed as an active power factor correction filter.

In some embodiments, the rectifier (GR) is set up to rectify selectively in a three-phase or in a single-phase state.

In some embodiments, there is a controller (ST), which is set up in a low-power state or a low-voltage state to activate only the first or the second DC/DC converter (DC1, DC2), only the first and the second DC/DC converter (DC1, DC2) or only the third DC/DC converter (DC3) and in a high-power state or a high-voltage voltage state to activate the first, the second DC/DC converter (DC1, DC2) and the third DC/DC converter (DC3).

In some embodiments, the third DC/DC converter (DC3) has a switch unit and, as intermediate circuit capacitance, the intermediate circuit capacitors (C1, C2) of the first and second DC/DC converter with which the switch unit of the third DC/DC converter (DC3) is connected in parallel.

BRIEF DESCRIPTION OF THE DRAWING

The single FIGURE shows an exemplary vehicle-side charging apparatus LV having an AC voltage connection WA incorporating teachings of the present disclosure.

DETAILED DESCRIPTION

Teachings of the present disclosure include a vehicle-side charging circuit in which a plurality of (DC-isolating) DC/DC converters can be connected in parallel or in series with one another by means of an adjustable switch apparatus in order to thus be able to adapt the charging circuit to the form (for instance: single-phase or multiphase) of the connection to an AC voltage network. A rectifier of the charging circuit is connected downstream of an AC voltage interface of the charging circuit and rectifies the voltage applied to the AC voltage interface. The rectified voltage (or its peak value) depends on the number of phases of the AC voltage interface. In the case of a 230 V network and a three-phase connection configuration, the result may therefore be a rectified voltage which is above a cut-off nominal voltage which can be achieved using a particular semiconductor technology. In order to provide, for the semiconductors of the DC/DC converters, a cut-off nominal voltage which does not restrict the technologies which can be used, the switch apparatus can connect the plurality of DC/DC converters in series with one another in this case. As a result, the operating voltage for each DC/DC converter is divided by the number of the latter. In the case of two DC/DC converters, the operating voltages with which the semiconductors of the DC/DC converters each operate are halved. In the case of single-phase operation, the DC/DC converters can be connected in parallel with one another in order to thus multiply the current-carrying capacity.

In order to adapt to a target power to be carried by the DC/DC converters, a third DC/DC converter may be provided, which is connected in parallel with the rectifier and which is also connected to the same DC voltage connection to which the first and second DC/DC converter are also connected. The DC/DC converters therefore have outputs which are connected to one another in parallel and which are connected, together, to the DC voltage connection. In the event of a high load, that is to say if the power required is high, all rectifiers are used for voltage conversion; depending on the input voltage, the first and second DC/DC converter can be connected to one another in parallel or in series (on the side facing the rectifier side). If the power required is lower, only the first and the second rectifier can be used. As a result, only the third rectifier (or its intermediate circuit capacitor) has to be designed for high voltages, but not the first and second rectifier. This results in the possibility of adapting to different voltage levels at the output of the rectifier and to different target powers, while the number or capacitance of the intermediate circuit capacitors, which must be designed for high voltages (>600 V), remains low.

The vehicle-side charging circuit is therefore equipped with an AC voltage interface and a rectifier connected thereto. In some embodiments, the AC voltage interface comprises a plug-in connection element having a plurality of contacts. The rectifier has the function of rectifying, but, in addition to this function, may also have further functions such as power factor correction or harmonic filtering in some embodiments; in some embodiments, the rectifier is an active rectifier. The rectifier has an AC voltage side. The rectifier is connected to the AC voltage interface by way of said AC voltage side. The rectifier can be designed to be adjustable for single-phase or multiphase (three-phase) AC voltage.

In some embodiments, the rectifier comprises at least one half-bridge (which may be controllable or may be a diode half-bridge) for each phase contact of the AC voltage interface. The AC voltage interface may have a neutral conductor contact. In some embodiments, the latter is connected to a (particularly separate) half-bridge of the rectifier. This half-bridge can differ from a half-bridge which is connected to a phase of the AC voltage interface and may be a diode half-bridge, in particular.

In some embodiments, the rectifier also comprises a DC voltage side. The half-bridges of the rectifier are connected to said DC voltage side or to the rectifier. The DC voltage side comprises, in particular, two DC voltage potentials or rails. The half-bridges are connected to the latter (in which case the two ends of the half-bridges, in particular, are connected here to these potentials or rails).

In some embodiments, at least one first and one second DC/DC converter are connected to the rectifier. Each DC/DC converter comprises in each case one intermediate circuit capacitor. Furthermore, each DC/DC converter comprises a switch unit (set up for clocked switching). The type of connection (parallel or series), by which the DC/DC converters are connected to the rectifier, can be adjusted by means of a switch apparatus. The switch apparatus connects the DC/DC converters in a switchable or configurable manner.

Different switching positions of the switch apparatus are linked to one another using different connections between the DC/DC converters. Different switching positions or switching states of the switch apparatus are also linked to different connections of the DC/DC converters on the one hand and to the rectifier on the other hand. In this regard, "different connections" refer to parallel connection (corresponding to a first switching state of the switch apparatus) on the one hand and series connection (corresponding to a second switching state of the switch apparatus).

The switch apparatus in a first switching state connects the intermediate circuit capacitors and the switch units of the first and second DC/DC converters in parallel with one another. The switch apparatus in a second switching state connects the intermediate circuit capacitors and connects the switch units to one another in series. The switch apparatus in a first switching state connects the first and second DC/DC converters in parallel with one another. This applies in particular to the side of the first and second DC/DC converter that faces the rectifier. The switch apparatus in a second switching state connects the first and second DC/DC converter to one another in series. This applies in particular to the side of the first and second DC/DC converter that faces the rectifier.

The DC/DC converters (in particular that side of the DC/DC converters which has the intermediate circuit capacitor) can be selectively connected in parallel or in series with one another by means of the switching apparatus. In particular, those sides of the DC/DC converters which face the rectifier can be adjustably connected in parallel or in series with one another by means of the switching apparatus. These sides can correspond to the input sides of the DC/DC converters, in particular during a charging operation. In the case of feedback (that is to say in the case of bidirectional DC/DC converters), the sides correspond to the outputs of the DC/DC converters.

The switching apparatus allows the inputs (in particular based on a charging operation) of the DC/DC converters to be connected in series or in parallel with one another. Since the DC/DC converters are connected to the rectifier, the type of connection between the DC/DC converters and the rectifier can therefore be adjusted by means of the switching apparatus. In the case of a connection in series, half the operating voltage (based on the rectified voltage) results in the case of two DC/DC converters, with the result that the switch elements and the intermediate circuit capacitors must be designed only according to this half operating voltage (or operating voltage divided by the number of converters). The DC/DC converters have a side facing the rectifier. These sides of the DC/DC converters are selectively or in a switchable manner (or adjustably) connected in parallel or in series with one another by means of the switching apparatus. The intermediate circuit capacitors are located on these sides and are therefore adjustably connected in parallel or in series with one another. This also applies to the switch units of the DC/DC converters.

The rectifier is connected to a vehicle electrical system via the DC voltage connection (and via the DC/DC converters). The vehicle electrical system is a circuit to which the charging apparatus can be connected, wherein the charging apparatus does not necessarily have to be viewed as part of the vehicle electrical system. In some embodiments, the DC voltage connection of the charging apparatus is a high-voltage connection and is therefore designed for operating voltages of >60 V, in particular for at least 400 V, 600 V or 800 V.

A vehicle electrical system having the charging circuit described here also comprises a rechargeable battery connected to the vehicle electrical system connection. In addition to the rechargeable battery, further components may be connected to the vehicle electrical system connection. The vehicle electrical system connection can be connected to the charging apparatus via isolating switches.

The third DC/DC converter (of the charging apparatus) also connects the rectifier to the DC voltage connection. The third DC/DC converter is connected in parallel with the first and the second DC/DC converter. The side of the third DC/DC converter facing the DC voltage connection is connected in parallel with the sides of the first and second DC/DC converter which are facing the DC voltage connection. Like the first and the second DC/DC converter, which are connected to the rectifier in parallel or in series depending on the configuration, the third DC/DC converter is also connected to the rectifier. The first, second and third DC/DC converter can be activated individually.

The third DC/DC converter can thus only be activated if this is necessary with regard to a required total power. This may also apply to the first and the second DC/DC converter. The first and the second DC/DC converter are designed for a lower rated voltage than the third DC/DC converter. As a result, the first and the second DC/DC converter can be manufactured more cheaply. The first and the second DC/DC converter can be adapted to the DC voltage of the rectifier by connecting the sides of the DC/DC converters facing the rectifier in series, which is different for a different number of phases (that is to say number of active phases of the rectifier) and for different input voltages.

The first, second and third DC/DC converter can each have connections connected to the DC voltage connection and in parallel with one another. As a result, the powers and currents can be bundled at the DC voltage connection.

In some embodiments, the first or the second DC/DC converter or both can be DC-isolating converters. In particular, that of the first and second DC/DC converters that is connected to the positive voltage rail of the rectifier is DC-isolating. This is used in particular for the potential-free voltage addition of the first and second DC/DC converter in a series configuration/connection. Furthermore, the third DC/DC converter can have a transformer (and thus form a DC-isolating DC/DC converter). The transformer can have a turns ratio that is not equal to one. The third DC/DC converter can be set up to generate a voltage on the side facing away from the rectifier over a voltage interval in which the voltage present on the side of the third DC/DC converter facing the rectifier is present.

In some embodiments, the third DC/DC converter can be configured (by means of the transformer) to generate on one side (output) a voltage over a voltage interval in which the voltage on the other side (input; that is to say the side facing the rectifier) falls. The third DC/DC converter can be configured to generate a voltage ratio (of the voltages on both sides of the DC/DC converter) of one. Overlapping voltage bands result for the third DC/DC converter.

This may be particularly advantageous in a three-phase 230 V AC network when the rectifier itself has a step-up converting function, for example as a power factor correction filter. The third DC/DC converter can be designed as a step-up converter (with regard to its circuitry design), where the transformer can have a transformation ratio of <1 in order to enable the same voltage to be able to be provided on both sides of the third DC/DC converter despite the design as a step-up converter. The transformer of the third DC/DC converter preferably has a winding (primary winding) facing the rectifier and having a smaller number of turns than a winding (secondary winding) of the transformer facing the DC voltage connection. The two windings mentioned are magnetically coupled by means of a common core. The DC-isolating DC/DC converters have a chopper circuit (on the side facing the rectifier) and a rectifier and smoothing circuit (on the side facing the DC voltage connection).

In some embodiments, the first DC/DC converter can be configured as a buck-boost converter. In some embodiments, the second DC/DC converter can be configured as a buck-boost converter. The third DC/DC converter may be designed either as a buck converter or as a boost converter. The third DC/DC converter can be designed as a buck converter or a boost converter, while the first and/or the second DC/DC converter is designed as a buck-boost converter. Another approach is to configure the first DC/DC converter, the second DC/DC converter and/or the third DC/DC converter as a step-up converter.

In some embodiments, the third DC/DC converter has the intermediate circuit capacitors of the first and second DC/DC converter as the intermediate circuit capacitance. By connecting the third DC/DC converter to the first and second DC/DC converter, the third DC/DC converter therefore uses the interconnected intermediate circuit capacitors of the first and second DC/DC converter as intermediate circuit capacitance.

The intermediate circuit capacitors of the first and second DC/DC converter form a series circuit. This series circuit is connected in parallel with the switch units. The switch units are, in particular, two switch units which are connected to one another via the connection point. The result is a series circuit of the switch units which is connected in parallel with the series circuit of the capacitors.

The switch units of the first, second and third DC/DC converter each comprise two switches, which are connected in series. In some embodiments, the switches are semiconductor switches, for example transistors. Since it applies to the first and second DC/DC converter that the total voltage of the rectifier is divided by dividing them into several DC/DC converters, transistors with a maximum voltage of less than 650 V, 700 V or 600 V can be used, for example what are known as "superjunction FETs" can be used. This applies, in particular, to a 230 volt network if it is connected to the charging circuit in a three-phase manner, with the result that it is not necessary to equip the DC/DC converters with transistors which must be designed with higher maximum voltages.

As a result, it is possible to dispense with SiC MOSFETs, for example, which constitute a significant cost factor. Transistors such as MOSFETs or IGBTs, in particular, are suitable as switch units. The switch unit of the third DC/DC converter comprises two switches, which may be semiconductor switches, for example transistors. These may be designed for a higher maximum voltage than the switches of the first and second DC/DC converters. The maximum voltage of the switches of the switch unit of the third DC/DC converter is thus more than 650, 700 or 600 volts. The switches of the switch unit of the third DC/DC converter can be designed as SiC transistors or as IGBTs with a corresponding maximum voltage.

In some embodiments, the rated powers of the first and second DC/DC converters are essentially the same. In some embodiments, the rated powers of the first and second DC/DC converters do not differ from one another by more than +/−10%. The rated powers of the first and second DC/DC converters can be, for example, between 4 and 6 kW, approximately substantially 5.5 kW. The rated power of the third DC/DC converter can be between 10 and 12 kW, approximately substantially 11 kW. The rated power of the third DC/DC converter may be higher than the rated power of the first DC/DC converter and may be higher than the rated power of the second DC/DC converter.

The rated powers of the first and second DC/DC converters can each essentially correspond to half the rated power of the third DC/DC converter or differ from one another by no more than +/−10%. This may be advantageous for single-phase and three-phase charging by means of a (symmetrical) 230 V three-phase network.

In some embodiments, the rectifier can be equipped with a step-up function. In some embodiments, the rectifier may be an active power factor correction filter, for example as a (e.g., multiphase) Vienna rectifier.

In some embodiments, the rectifier has one or more switchable half-bridges. The half-bridges are fully switchable, in particular, that is to say each consist of a series circuit comprising two switches such as transistors. The half-bridges and their connection points or intermediate taps are connected to the AC voltage interface directly or via series inductances, in particular. In the case of a connection via respective series inductances, the result is a power factor correction circuit which has both a rectifying function and a voltage-converting function, in particular a step-up conversion function. The rectifier between the AC interface and the DC/DC converters may be an active rectifier and, if it is equipped with series inductances as described, can also perform a correcting function with respect to the power factor and/or may have a harmonic-attenuating effect.

In some embodiments, the AC voltage interface may have a single-phase configuration or a multiphase configuration, for example a three-phase configuration. The rectifier between the AC voltage interface and the DC/DC converters therefore may also have a single-phase, multiphase or, in particular, three-phase configuration. In some embodiments, the number of phases of the AC voltage interface corresponds to the number of phases of the rectifier which is connected downstream of the AC voltage interface. In some embodiments, the number of phases of the rectifier corresponds to the number of (switchable) half-bridges of the rectifier. Provision may be made for an additional half-bridge in the form of a diode half-bridge to also be provided. In this case, the rectifier comprises a number of (switchable) half-bridges and an additional half-bridge which is in the form of a diode bridge, in particular.

In some embodiments, the rectifier may have a configurable number of phases. The rectifier can be set up in this case to rectify selectively in a three-phase or in a single-phase state. For the single-phase state, phases separated in the three-phase state and assigned to different voltage phases (of the AC interface) may be connected to one another. Switchable connections can be provided between the phases of the AC voltage interface. These may connect all phases (in a switchable manner) with one another if the interface itself is only occupied in one phase or is operated in one phase. Otherwise, the connections are not present or are open.

In the case of multiphase or three-phase use of the AC voltage interface, the connections are not provided or are open. The connections therefore allow a configuration and, in particular, the distribution of the current to be carried over all half-bridges of the rectifier, even in the case of only single-phase use of the AC interface. The AC voltage interface may therefore be equipped with a plurality of phase contacts. The phase contacts are connected to one another by means of connections in a single-phase state. The phase contacts are individually connected to the individual half-bridges, that is to say to the individual half-bridges of the rectifier, in a multiphase state. The phases of the AC voltage interface are not connected to another in the multiphase state.

In some embodiments, the connections can be provided by semiconductor switches or electromechanical switches. This makes it possible in a simple and inexpensive way to select a configuration in order to adapt the charging circuit to single-phase or multiphase switching.

In some embodiments, the charging circuit may also have a controller. This is connected to the DC/DC converters (in particular with their switch units) in a controlling manner. The controller is set up to activate only the first or the second DC/DC converter, only the first and the second DC/DC converter or only the third DC/DC converter in a low-power state or a low-voltage state. The other respective DC/DC converters are controlled by the controller to be inactive. The controller is also set up to activate the first, the second DC/DC converter and the third DC/DC converter in a high-power state or a high-voltage voltage state.

The low-power state occurs when a target power or a target current (for example a target charging power or a target charging current) is below a threshold value. The low-voltage state occurs when a target voltage (for example a target charging voltage) is below a threshold value. The high-power state occurs when a target power or a target current (for example a target charging power or a target charging current) is above a threshold value. The high-voltage voltage state occurs when a target voltage (for example a target charging voltage) is above a threshold value.

The threshold values in this case reflect the limit which, when exceeded, an (additional) DC/DC converter must be activated (in order to meet the target specification), and, when undershot, a DC/DC converter can be deactivated (since not all DC/DC converters are required to achieve the target specification). The controller is set up to receive a corresponding current, power and/or voltage specification and, on the basis of this, to set one of the states mentioned. For this purpose, the controller can have an input, which is set up to receive a signal, which has the target power, the target current and/or the target voltage. The controller can have a comparator by means of which the values reproduced by the signal are compared with the relevant threshold value. The threshold value can in this case be stored in a memory of the controller.

In some embodiments, there is a controller connected to the switch unit in a driving manner. This controller can be provided in addition to the controller described above, or the controllers can be formed upstream of the same control device. The controller connected to the switch unit in a controlling manner can set whether the DC/DC converters are connected in series or in parallel with one another. As a result, said controller can set, in particular, whether those sides of the DC/DC converters which face the rectifier are connected in parallel or in series with one another. As a result, this controller can set whether the current-carrying capacity is multiplied by connecting the rectifiers in parallel or whether the respective operating voltage is divided according to the number of DC/DC converters by connecting the DC/DC converters in series. The controller controls the switch unit to connect the DC/DC converters in parallel with one another in a single-phase state.

In a multiphase state, the controller connected to the switch unit controls this in order to connect the DC/DC converters in series. This applies in particular to the series or parallel connection of the respective intermediate circuit capacitors or the switch units of the relevant DC/DC converters. If connections which are switchable (for instance by means of semiconductor switches or by means of electromechanical switches inside the connections) are also provided between the phase contacts of the AC voltage interface, these connections between the phases or phase contacts are established if the single-phase state is provided and are disconnected if the multiphase state is provided. It is possible to provide a capture device which captures the use state at the AC interface and captures, in particular, whether one or more phases of the interface are used. If a plurality of phases are used, the multiphase state is set, and, if only one phase is used, the single-phase state is set. The capture device can be part of the controller connected to the switch unit or can be connected upstream thereof in order to supply the corresponding information.

In some embodiments, the rectifier may have a diode half-bridge which is connected to a neutral conductor contact of the AC voltage interface. In addition to the diode half-bridge, the rectifier comprises half-bridges having switch units, wherein each of these half-bridges is assigned to a phase of the AC voltage interface or is connected thereto (for example via inductances).

As mentioned, the rectifier may comprise an active rectifier. In this case, the rectifier comprises one or more half-bridges which each comprise a series circuit comprising two switching elements. The rectifier may comprise an active power factor correction filter. In this case, the rectifier comprises a plurality of half-bridge circuits which are connected to the AC interface via series inductances. The connections are individual in this case, with the result that the series inductances also constitute an individual connection between the respective half-bridge and the phase contact of the AC voltage interface. As mentioned, for single-phase charging or in the single-phase state, provision may be made for the phase contacts to be connected to one another via corresponding connections. The rectifier may be in the form of a Vienna rectifier, in particular.

The single FIGURE is used to explain the charging circuit described here in more detail. The single FIGURE shows an exemplary vehicle-side charging apparatus LV having an AC voltage connection WA. The latter has a three-phase design and is set up for connection to a three-phase supply network (not illustrated). A rectifier GR is connected to the AC voltage connection WA and thus also has a three-phase design. The rectifier GR connects the AC voltage connection (in a rectifying manner) to a first DC/DC converter DC1 and a second DC/DC converter DC2. A third DC/DC converter DC3 is also connected to the rectifier. In other words, the rectifier GR connects the AC voltage connection (in a rectifying manner) to the third DC/DC converter DC3. The DC/DC converters DC1-DC3 are connected to a DC voltage side of the rectifier GR.

The first DC/DC converter DC1 comprises a switch unit SE1 (in a block diagram for simplification) and an intermediate circuit capacitor C1. The second DC/DC converter DC2 comprises a switch unit SE2 and an intermediate circuit capacitor C2.

The DC/DC converters DC1-DC3 are connected to a DC voltage connection GA of the charging apparatus (for example for connection to a vehicle electrical system branch or a component thereof, for example to a high-voltage rechargeable battery). In this case, those sides of the DC/DC converters DC1-DC3 which face away from the rectifier GR are connected to the DC voltage connection GA. The relevant sides of the DC/DC converters DC1-DC3 (which can also be referred to as output sides) are in this case connected to one another in parallel.

A switch apparatus S1, S2, S3 is used for the series or parallel configuration of the DC/DC converters DC1 and DC2. In particular, the sides of the DC/DC converters DC1 and DC2 which face the rectifier GR or are connected thereto are provided in a configurable manner as a result. The switches S1 to S3 are connected in series, whereby the resulting series circuit is connected in parallel with the rectifier GR (or to its DC voltage side).

The intermediate circuit capacitors C1 and C2 of the DC/DC converters DC1 and DC2 are connected to one another in series via the switch S3. The resulting series connection of the intermediate circuit capacitors C1 and C2 and of the interposed switch S3 is also connected to the rectifier GR (that is to say connected in parallel therewith). The switches S1 and S2 on the one hand and the switch S3 on the other hand are switched alternately and are therefore closed alternately.

If the switches S1 and S2 are closed (and switch S3 is open), then the capacitors C1 and C2 are connected in parallel with one another and thus both are each connected in parallel with the rectifier GR. As a result, in this case both capacitors C1 and C2 each receive the full voltage that is output by the rectifier GR. In the other case, that is to say when the switch S3 is closed and the switches S1 and S2 are open, then the capacitors C1 and C2 are connected in series, with this series circuit then being connected to the rectifier GR. As a result, the DC voltage applied to the rectifier GR is divided between the two capacitors C1 and C2. The latter case is used when the voltage at the rectifier is high (for example with three-phase rectification of a three-phase AC voltage at the connection WA) in order to prevent the capacitors C1 and C2 having to be designed for particularly high maximum voltages (that is to say for maximum voltages greater than the maximum voltage resulting in the single-phase case).

The switches S1 to S3 are used for the series or parallel configuration of the first and second DC/DC converter DC1, DC2, in particular depending on the voltage that is output by the rectifier GR. This in turn depends on the single-phase or three-phase rectification by the rectifier GR. In this way, as mentioned at the beginning, the configuration of the DC voltage from DC1 and DC2 can be adapted to the target voltages to be generated or other target specifications.

With regard to DC/DC converters DC1 and DC2 that can configure their connection, the DC/DC converter DC3 is connected in parallel with the rectifier GR. As a result, the third DC/DC converter receives the full voltage that is output by the rectifier GR by way of the switches S1 to S3, regardless of the configuration. The DC/DC converter DC3 can be activated if this is necessary on the basis of a predetermined target voltage to be generated or on the basis of a predetermined target current to be generated. Otherwise, it can be deactivated, for example, in order to enable greater efficiency or to prevent aging.

The third DC/DC converter DC3 is connected in parallel with the rectifier GR and can therefore use the intermediate circuit capacitors C1 and C2 as the intermediate circuit capacitance. In this case, the third DC/DC converter cannot have its own intermediate circuit capacitor but comprises "only" a relevant switch unit (as the DC/DC converters DC1 and DC2 also have in the form of the units SE1 and SE2).

A controller C is connected to the DC/DC converters DC1 to DC3 in a controlling manner. The controller C is set up to activate the DC/DC converters DC1 to DC3 depending on a target power or a target current, or also depending on a target voltage, or to activate only selected ones of the DC/DC converters DC1 to DC3 while at least one DC/DC converter of the DC/DC converters DC1 to DC3 remains inactivated.

In the single FIGURE, the following possible operating modes are also intended to serve for understanding:

low-power state 1 (charging with a target power of up to 5.5 kW):
charging with a power of up to 5.5 kW: activation of DC1 or DC2 (DC3 deactivated);
low-power state 2 (charging with a power of less than 7.4 kW (charging with a target power of up to 7.4 kW, in particular more than 5.5 kW and less than 7.4 kW)):
activate DC1 and DC2 (with deactivated DC3) or activate DC3 (with deactivated DC1, DC2);
high-power state:
three-phase charging with DC3 activated (and DC1 and DC2 activated).

The controller is set up to set said states on the basis of a target specification. The target specification can be a target power, a target voltage or a target current that is to be supplied by the charging apparatus. The stated values refer to a three-phase 230-volt AC network. The low-power states can also be referred to as low-power states and relate to an operation in which the rectifier generates a voltage of approximately 400 volts. The high-power state can also represent a high-voltage voltage state in which three-phase rectification is carried out and the rectifier GR thus generates a voltage of 700 to 800 volts.

The following operating modes are also possible (with the controller set up to set the states):
low-power state 1—target power of up to 5.5 kW:
activate DC1 or DC2
low-power state 2—target power from 5.5 kW to 11 kW:
activate DC1 and DC2 or activate DC3
high-power state—target power at least 11 kW:
activate DC1, DC2 and DC3.

These modes also relate to a 230 volt three-phase network. Since, as mentioned, the rectifier can operate in one or three phases, the rectifier can be operated in one or three phases depending on the target voltage of the battery or the state of charge of the battery that can be connected to the GA. In single-phase operation, there is a lower rectified voltage at the rectifier GR in order to take into account a lower target voltage at the connection GA. If charging is to be carried out with a high power, the rectifier GR can be operated in three phases, with a higher voltage also being generated as a result (which should correspond to a target voltage).

The invention claimed is:

1. A vehicle-side charging apparatus comprising:
an AC voltage connection; a rectifier connected to the AC voltage connection;
a first DC/DC converter and a second DC/DC converter, each Dc/DC converter including a respective intermediate circuit capacitor and a respective switch unit;
a DC voltage connection; wherein the rectifier is connected to the DC voltage connection via the DC/DC converters;
a switch connecting the first DC/DC converter to the second DC/DC converter in a switchable manner, wherein the switch in a first switching state connects the respective intermediate circuit capacitors and the respective switch units of the first DC/DC converter and the second DC/DC converter in parallel with one another and in a second switching state connects the respective intermediate circuit capacitors and the respective switch units in series with one another; and
a third DC/DC converter connecting the rectifier to the DC voltage connection.

2. The vehicle-side charging apparatus as claimed in claim 1, wherein the first DC/DC converter, the second DC/DC converter, and the third DC/DC converter each have connections connected to the DC voltage connection and in parallel with one another.

3. The vehicle-side charging apparatus as claimed in claim 1, wherein at least one of the first DC/DC converter and the second DC/DC converter comprises a DC-isolating DC/DC converter.

4. The vehicle-side charging apparatus as claimed in claim 1, wherein the first DC/DC converter and the second DC/DC converter each comprise a buck-boost converter and the third DC/DC converter is designed either as a buck converter or a boost converter.

5. The vehicle-side charging apparatus as claimed in claim 1, wherein the first DC/DC converter and the second DC/DC converters have essentially equal rated power.

6. The vehicle-side charging apparatus as claimed in claim 5, wherein a rated power the third DC/DC converter is twice the rated power of the first DC/DC converter.

7. The vehicle-side charging apparatus as claimed in claim 1, wherein the rectifier includes a boost function.

8. The vehicle-side charging apparatus as claimed in claim 1, wherein the rectifier comprises an active power factor correction filter.

9. The vehicle-side charging apparatus as claimed in claim 1, wherein the rectifier is programmed to rectify selectively in a three-phase or in a single-phase state.

10. The vehicle-side charging circuit as claimed in claim 1, further comprising a controller with a low-power state or a low-voltage state to selectively activate only the first DC/DC converter, only the second DC/DC converter, both the first DC/DC converter and the second DC/DC converter, or only the third DC/DC converter, and a high-power state or a high-voltage voltage state to activate all of the first DC/DC converter, the second DC/DC converter, and the third DC/DC converter.

11. The vehicle-side charging circuit as claimed in claim 1, wherein the third DC/DC converter comprises a switch unit; and
wherein the respective intermediate circuit capacitors of the first DC/DC converter and the second DC/DC converter are connected in parallel with the switch unit of the third DC/DC converter.

* * * * *